US006637581B2

(12) United States Patent
Goater

(10) Patent No.: US 6,637,581 B2
(45) Date of Patent: Oct. 28, 2003

(54) VERTICAL LOG SINGULATOR WITH PROFILED SURFACE

(75) Inventor: George H. Goater, Delta (CA)

(73) Assignee: George A. Goater, Delta (CA)

( * ) Notice: Subject to any disclaimer, the term of this patent is extended or adjusted under 35 U.S.C. 154(b) by 68 days.

(21) Appl. No.: 09/843,807

(22) Filed: Apr. 30, 2001

(65) Prior Publication Data

US 2002/0158078 A1 Oct. 31, 2002

(51) Int. Cl.[7] .............................................. B65G 25/00
(52) U.S. Cl. ............................... 198/463.5; 198/459.5; 209/517; 209/521; 414/746.2; 414/746.1; 414/745.9
(58) Field of Search .......................... 198/463.5, 459.5; 209/517, 521; 414/745.9, 746.2, 746.1

(56) References Cited

U.S. PATENT DOCUMENTS

| 3,700,116 | A | * | 10/1972 | Rysti ......................... 414/746.2 |
| 4,029,215 | A | * | 6/1977 | Birdwell .................... 198/468.6 |
| 4,624,361 | A | * | 11/1986 | Hollins ...................... 198/463.5 |
| 4,662,506 | A | * | 5/1987 | Tueckmantel et al. ....... 198/444 |
| 4,911,283 | A | * | 3/1990 | Hollins ...................... 198/463.5 |
| 5,011,024 | A | | 4/1991 | Bunney |
| 5,119,930 | A | * | 6/1992 | Stelter ....................... 198/463.5 |
| 5,174,351 | A | | 12/1992 | Lindenblatt et al. |
| 5,217,106 | A | * | 6/1993 | Bunney ........................ 198/443 |
| 5,257,688 | A | | 11/1993 | Fridlund |
| 5,257,898 | A | * | 11/1993 | Blume ........................ 156/357 |
| 5,423,417 | A | * | 6/1995 | Redekop .................... 198/774.1 |
| 5,678,681 | A | * | 10/1997 | Klockars et al. .......... 198/459.3 |
| 6,336,547 | B1 | * | 1/2002 | Redekop ...................... 198/444 |
| 6,386,823 | B1 | * | 5/2002 | Perreault .................... 198/608 |

* cited by examiner

Primary Examiner—Donald P. Walsh
Assistant Examiner—Jonathan R Miller
(74) Attorney, Agent, or Firm—Oyen Wiggs Green & Mutala

(57) ABSTRACT

This invention provides log singulators which allow for the vertical singulation of piles of logs fed from typical in-feed log decks, so that these logs may be fed individually to typical out-feed conveyors. Devices provided by this invention may be high-speed singulators occupying minimal floor space area. Singulators provided by this invention comprise arcuately oscillating lifting devices ("primary lifting devices"), preferably rotating synchronously in opposite directions. Preferably, these singulators elevate logs against vertically successive barriers. These barriers are shaped so that only one of either a largest log or a smallest log, which it is expected that the singulator should handle, can rest on the primary lifting devices and be carried upward at a time. As a result, the lower section of these barriers is shaped in a manner that does not allow two smallest logs to rest side by side on the primary lifting devices, but allows a single smallest or a single largest (or any single log within the range) to rest on the primary lifting devices and be raised upward. Singulators provided by this invention may also comprise an unloading station, which receives the logs from the primary lifting devices and directs them to the out-feed conveyor.

28 Claims, 13 Drawing Sheets

VERTICAL LOG SINGULATOR WITH PROFILED SURFACE

FIELD OF THE INVENTION

This invention relates to an apparatus for separating logs from a pile so that the logs may be taken individually for further processing.

BACKGROUND

Logs received at a typical wood processing facility, such as a sawmill, vary both in diameter and length. The logs may be tapered differently from one another and come in a variety of physical shapes, all of which are different from the ideal log shape, which is straight, has a perfectly circular cross-sectional area and a constant diameter throughout its length. Finally, the logs are typically deep piled on an in-feed log deck, such that the logs become skewed, crossed and/or tangled. It is generally necessary to feed the logs to the processing facility one log at a time. It is also desirable that there be no interruption in the flow of logs into the wood processing facility. A device is needed to accomplish the task of separating logs received as outlined above.

Such a device is often called a log singulator. A log singulator separates logs from a pile and feeds them one at a time to a log processing facility, typically by way of an out-feed conveyor. Log singulators come in different types.

"Step sorter" singulators, such as the devices shown by U.S. Pat. No. 5,423,417 ("Log Ladder"), U.S. Pat. No. 5,257,688 ("Step Feeder") and U.S. Pat. No. 5,174,351 (additions to "Step Feeder"), sort logs in a series of steps which are distributed horizontally along a small vertical incline. The main disadvantages of such singulators are imprecise separation of logs (i.e. tendency to carry more than one log at a time toward the wood processing facility) and high floor area occupied within the processing facility. Another common disadvantage of some of these singulators is the absence of surge and catch-up features. Such features are usually used to ensure that logs are fed at an optimal rate to a wood processing facility.

"Rotary sorter" singulators, such as the device described in U.S. Pat. No. 5,011,024 ("Rotary Log Sorter"), have drums with pockets or arms that rotate continuously. The pockets or arms carry logs one at a time to an out-feed conveyor. A main problem with such singulators is that occasionally more than one log will be taken in by the pockets or arms. Such singulators are also poor at efficiently raising logs vertically, as they occupy more floor space than desired when doing so. Another problem associated with such singulators is the inability to singulate oddly-shaped logs. Another common disadvantage of such singulators is the absence of surge and catch-up features to ensure that logs are fed at an optimal rate to a wood processing facility.

"Oscillating quadrant/arc" singulators, such as the device described in U.S. Pat. No. 5,119,930 ("Quadrant Log Feeder"), elevate logs along a curved surface. The main disadvantages of such singulators are imprecise separation of logs and low singulation speed (i.e. the number of logs per minute that can be separated from an in-feed log deck and fed, one at a time, to an out-feed conveyor). Also, such singulators do not provide for optimal surge and catch-up features to ensure that logs are fed, one at a time and at an optimal rate, to an out-feed conveyor.

There is therefore a need for log singulators which address at least some of these deficiencies. There is a particular need for singulators which can singulate logs with increased precision. There is a further need for high speed log singulators which occupy minimal floor space area and substantially elevate logs vertically to take advantage of the vertical space available within a typical wood processing facility. There is a further need for singulators which can handle logs with a large range of diameters and a large range of shapes. There is further a need for singulators with surge and catch-up features which can help to feed logs at an optimal rate to a wood processing facility.

SUMMARY OF INVENTION

This invention provides log singulators which allow for the vertical singulation of piles of logs fed from typical in-feed log decks, so that these logs may be fed individually to a wood processing facility.

This invention provides log singulators comprising arcuately oscillating primary lifting devices, adapted for elevating logs from a log input mechanism to an unloading station, wherein the logs are raised by vertically successive primary lifting devices. Vertically adjacent primary lifting devices may move synchronously in opposite directions to one another.

This invention further provides log singulators comprising guiding barriers, against which the primary lifting devices raise the logs. In a preferred embodiment of this invention, the guiding barriers comprise sets of guiding rails, adjacently separated by recessed plates.

Preferably, the primary lifting devices comprise pivotally mounted lifting surfaces extending through the guiding barriers against which the lifting surfaces are raising the log. The lifting surfaces are preferably located at end of fins extending through the guiding barriers. The point of pivot is recessed away from the log input mechanism and the lifting surfaces slope toward the guiding barriers.

In the preferred embodiment of this invention, each set of guiding rails comprises adjacent guiding rails spaced apart a sufficient width to permit the passage of the fins and of the lifting surfaces.

According to this invention, the guiding barrier is shaped so that only one, of either the largest log or the smallest log which the singulator is expected to handle, can be carried upward at a time by the lifting surfaces.

The guiding barrier is divided in two sections: an upper section and a lower section. The separation point between the upper and the lower section is located around the point of contact a largest log (which the singulator is expected to handle) has with the barrier, when:

a) the largest log is positioned on the lifting surfaces and resting against the guiding barrier, and b) the lifting surfaces are located at their lowest position.

The shape of the lower section is such that, when the lifting surfaces are located at their lowest position:

a) a smallest log (which the singulator is expected to handle) positioned:
   i) on the lifting surfaces, and
   ii) resting adjacently and outwardly from the guiding barrier against any log (falling within a range of logs which the singulator is expected to handle) which is positioned on the lifting surfaces and resting against the guiding barrier, would have its centre of gravity located outside of the tipping point of the lifting surfaces; and b) a largest log (which the singulator is expected to handle), positioned:

i) on the lifting surfaces, and
ii) resting against the guiding barrier,
would have its centre of gravity located inside of the tipping point of the lifting surfaces.

The shape of the upper section is such that, throughout the movement of the lifting surfaces raising the largest log, the centre of gravity of the largest log remains inside the tipping point of the lifting surfaces.

The vertically highest (i.e. upper) primary lifting device carries logs to the unloading station. Pursuant to the invention, the unloading station can comprise oscillating secondary lifting devices, adapted for moving logs to an out-feed device, wherein the logs are moved by horizontally adjacent secondary lifting devices. Horizontally adjacent secondary lifting devices may move synchronously in opposite directions to one another.

According to this invention, the unloading station may comprise secondary holding notches, wherein logs are moved, in a stepwise manner, over horizontally adjacent secondary holding notches, to the out-feed device.

The face of the secondary holding notches, against which logs are raised, preferably slopes away from the path of movement of the relevant secondary lifting device.

Preferably, each secondary lifting device comprises secondary lifting surfaces extending through the secondary holding notches against which the secondary lifting surfaces are raising logs. The secondary lifting surfaces preferably slope toward the relevant secondary holding notch.

The unloading station may comprise a sensor, adapted to stop the movement of the primary lifting devices when the sensor has detected that the first secondary holding notch is unavailable to receive a log. The unloading station may also comprise a sensor, adapted to stop the movement of the secondary lifting devices when the sensor has detected that the out-feed device is unavailable to receive a log.

The unloading station may also comprise a surge area, adapted for receiving a log from the upper primary lifting device when the first secondary holding notch is unavailable to receive a log. In this embodiment, the unloading station may comprise a sensor, adapted to stop the movement of the primary lifting devices when the sensor has detected that the surge area is unavailable to receive a log.

This invention further provides a method for vertically singulating a pile of logs fed transversely from an in-feed log deck, the method comprising of elevating one of the logs along vertically successive arcuate paths up to an unloading station. The step of elevating one of the logs can be accomplished by providing vertically successive arcuately oscillating lifting devices. The step of elevating one of the logs can further be accomplished by providing vertically successive barriers against which the one log is raised by the lifting devices.

The step of providing vertically successive barriers comprises providing barriers whose shape are as outlined above.

Further features and advantages of the invention are described as follows.

BRIEF DESCRIPTION OF DRAWINGS

In drawings which illustrate various non limiting embodiments of the invention.

DETAILED DESCRIPTION

Figure 1:
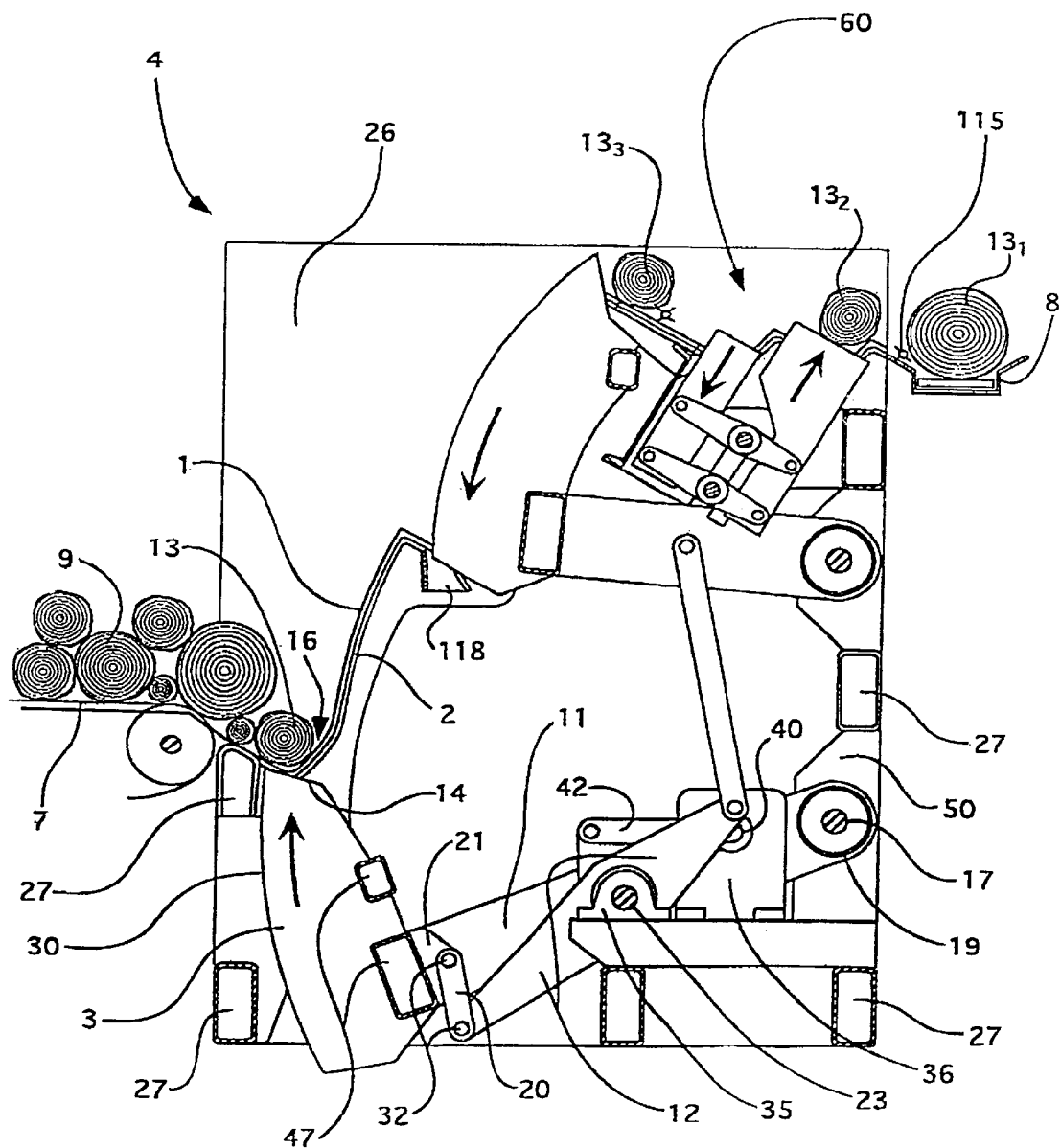
FIG. 1 is a schematic side view of the log singulator according to a preferred embodiment of the invention.

As required, detailed embodiments of the present invention are disclosed herein. However, it is to be understood that the disclosed embodiments are merely exemplary of the invention, which may be embodied in various forms. Therefore, specific structural and functional details disclosed herein are not to be determined as limiting, but merely as a basis for the claims and a representative basis for teaching one skilled in the art to variously employ the present invention in virtually any appropriately detailed structure.

This invention provides a log singulator, more specifically a vertical log singulator with a shaped guiding barrier against which logs are raised. The shape of the barrier helps to prevent multiple small logs from being taken together without interfering with the selection of larger logs. A log singulator 4 according to a currently preferred embodiment of the invention is shown in FIGS. 1 and 2A through 2D. Singulator 4 basically operates as follows. Singulator 4 receives logs from a typical in-feed log deck 7 (see FIG. 1). Singulator 4 has a number of lower lifting devices (defined in the currently preferred embodiment by lower lifting plates 3). As singulator 4 operates, lower lifting plates 3 move upward from beneath a lower log holding position (defined in the currently preferred embodiment by lower holding notches 16). A log in the lower log holding position can therefore be carried upward by lower lifting plates 3 (see FIGS. 2A–2B). As it is lifted, the log rides against a shaped lower guiding barrier (defined in the currently preferred embodiment by lower guiding rails 1) until it is deposited in an upper log holding position (defined in the currently preferred embodiment by upper holding notches 116) (see FIG. 2C). The shape of the lower guiding barrier provides accurate singulation of logs as described below.

Singulator 4 also has a number of upper lifting devices (defined in the currently preferred embodiment by upper lifting plates 103). As singulator 4 operates, lifting plates 103 move upward from beneath the upper log holding position. From the upper log holding position, the log can therefore be carried farther upwards by upper lifting plates 103. As it is lifted from the upper log holding position, the log rides against an upper guiding barrier (defined in the currently preferred embodiment by upper guiding rails 101), until it is deposited at an unloading station 60. The shape of the upper guiding barrier also provides accurate singulation of logs.

Once in unloading station 60, the log is ultimately fed onto an out-feed conveyor 8. In the currently preferred embodiment of the invention, the sets of lifting plates 3 and 103 oscillate synchronously in opposite directions to one another. Each set of lifting plates move along an arcuate path. Upper lifting plates 103 are near the bottom ends of their paths below upper holding notches 116 just when lower lifting plates 3 are at the upper end of their paths and are depositing a log in upper holding notches 116 (see FIG. 2C).

A more detailed description of the operation of singulator 4 is as follows. FIGS. 1 and 2A through 2D show schematic side views of a log singulator 4 according to a currently preferred embodiment of the invention, each Figure showing the singulator at a different stage of operation.

Figure 5:
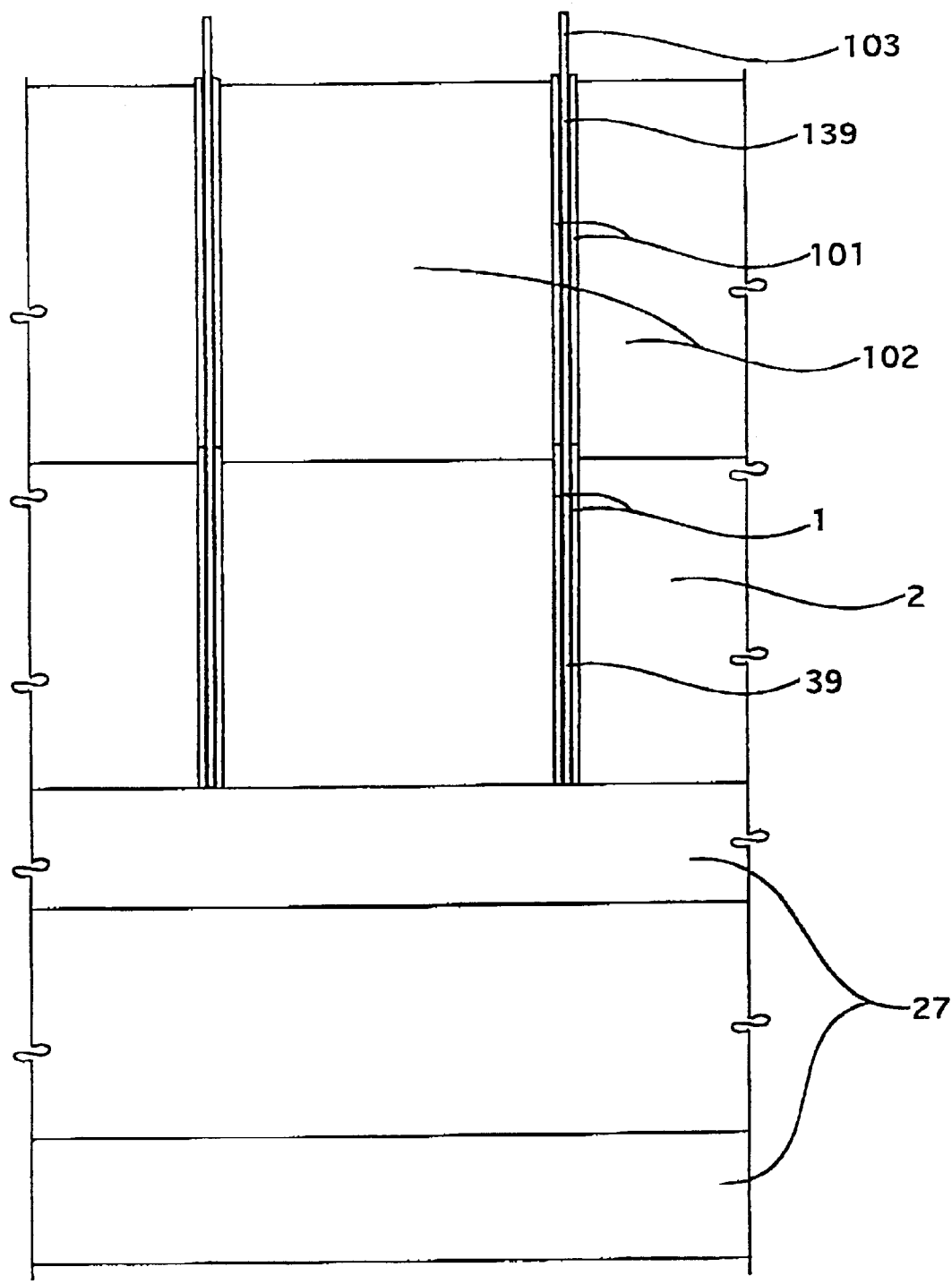
FIG. 5 is a schematic frontal view of the log singulator.

A pile of incoming logs 9 is fed to singulator 4 via log deck 7. Logs 9 are generally stacked in a transverse direction in relation to the movement of log deck 7, with singulator 4 receiving logs accordingly. Log deck 7 pushes logs 9 against the lower guiding barrier. Preferably, the lower guiding barrier comprises a number of lower guiding rails 1. In the preferred embodiment, guiding rails 1 are in pairs. Log deck 7 pushes logs 9 against lower guiding rails 1. This helps to maintain proper alignment of any logs which may have been skewed and were not sitting transversely to the direction of movement of log deck 7. As shown in FIG. 5, each pair of guiding rails 1 comprises adjacent guiding rails spaced apart on either side of a slot 39. Slots 39 are of sufficient width to permit passage of lower lifting plates 3. Continuous surface plates 2, located between each set of guiding rails 1, prevent log ends or debris from protruding into the mechanism of singulator 4. Furthermore, continuous surface plates 2 are recessed so as not to interfere with the guiding function of guiding rails 1.

Located at the lower ends of lower guiding rails 1 are lower holding notches 16. Openings 18 allow bark and other debris to fall through (shown in FIG. 2C).

Lower lifting surfaces 14, located at the top edge of each lower lifting plate 3, constitute the points of engagement with logs being singulated. As log 13 is lifted upward by lower lifting surfaces 14, it slides, or rolls, against lower guiding rails 1.

Preferably, the shape of lower lifting surfaces 14 is generally flat and slightly angled so that lifting surfaces 14 slope toward guiding rails 1. The slope enables lower lifting surfaces 14 to properly engage log 13 cradled in lower holding notches 16 and to lift log 13. As log 13 is lifted, the slope causes it to bear against the lower guiding barrier, which is embodied in the preferred embodiment by guiding rails 1.

Figure 8:
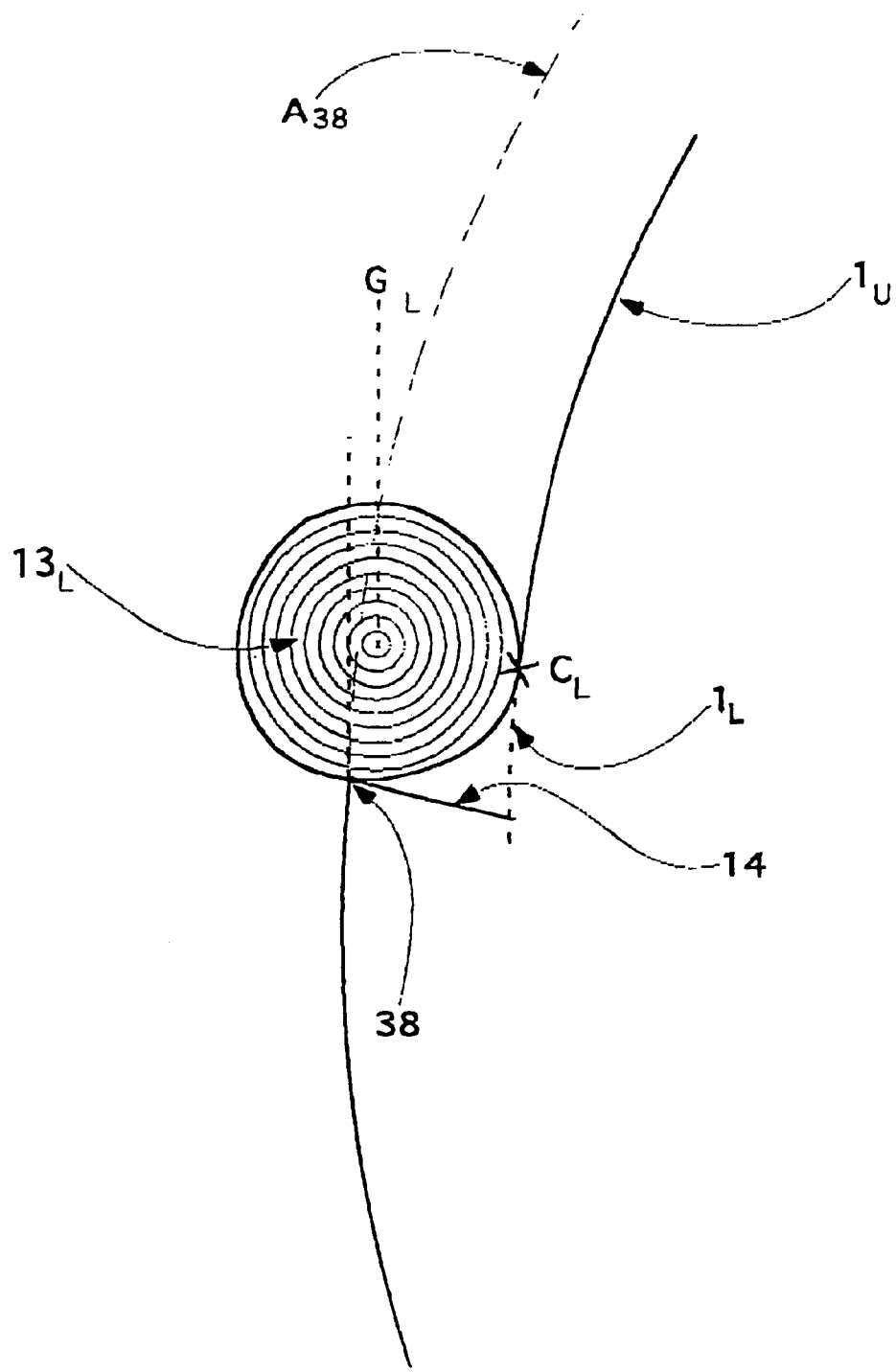
FIG. 8 is a schematic view of a largest log sitting on lower lifting surfaces of a log singulator according to a currently preferred embodiment of the invention.

As shown in FIG. 8, tipping point 38, which is at the outer edge of lifting surface 14, moves along an arc $A_{38}$, as lifting surfaces 14 are raised. Tipping point 38 is spaced outwardly from the lower guiding barrier by a sufficient distance to ensure that the largest log $13_L$, which it is expected that singulator 4 should handle, will be properly carried upward by lower lifting surfaces 14. This is accomplished by ensuring that, as largest log $13_L$ is carried upward against the lower guiding barrier, its centre of gravity $G_L$ will remain at all times toward the guiding barrier from tipping point 38. Designing for largest log $13_L$ will ensure that centre of gravity G of any smaller log will remain at all times within tipping point 38. The lower guiding barrier has two portions: an upper portion $1_U$ and a lower portion $1_L$. As shown in FIG. 8, which is a partial schematic side view of singulator 4 with lower lifting surfaces 14 positioned at their vertically lowest point and supporting a largest log $13_L$, the contact point $C_L$ of largest log $13_L$ with the lower guiding barrier is the approximate boundary between upper portion $1_U$ and lower portion $1_L$.

In the preferred embodiment of the invention, upper portion $1_U$ curves along an arcuate path whose centre of curvature coincides generally with the centre of curvature of arc $A_{38}$. However, upper portion $1_U$ may be of any shape which will result in centre of gravity $G_L$ of largest log $13_L$ remaining at all times within tipping point 38 as it is being carried upward against the lower guiding barrier. For example, upper portion $1_U$ can curve along an arcuate path whose centre of curvature, when compared to centre of curvature of arc $A_{38}$, is displaced horizontally away from the log input area of singulator 4 (i.e. away from log deck 7). In the alternative, upper portion $1_U$ could be linear and slope away from the log input area of singulator 4 (i.e. away from log deck 7). Both of the above examples are not the preferred shapes as they do not necessarily result in a path for log 13 which constantly moves away (i.e. away from log deck 7) from the path of lifting surfaces 14 (i.e from arc $A_{38}$) as it rises vertically, so as to provide optimal relief and minimize power requirement.

Figure 9A:
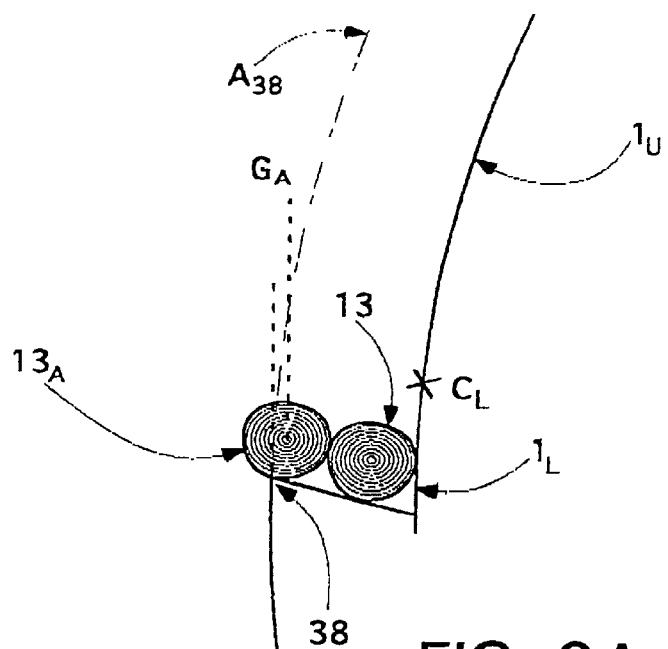
FIG. 9A is a schematic view of two smaller logs sitting on lower lifting surfaces of a prior art log singulator.
Figure 9B:
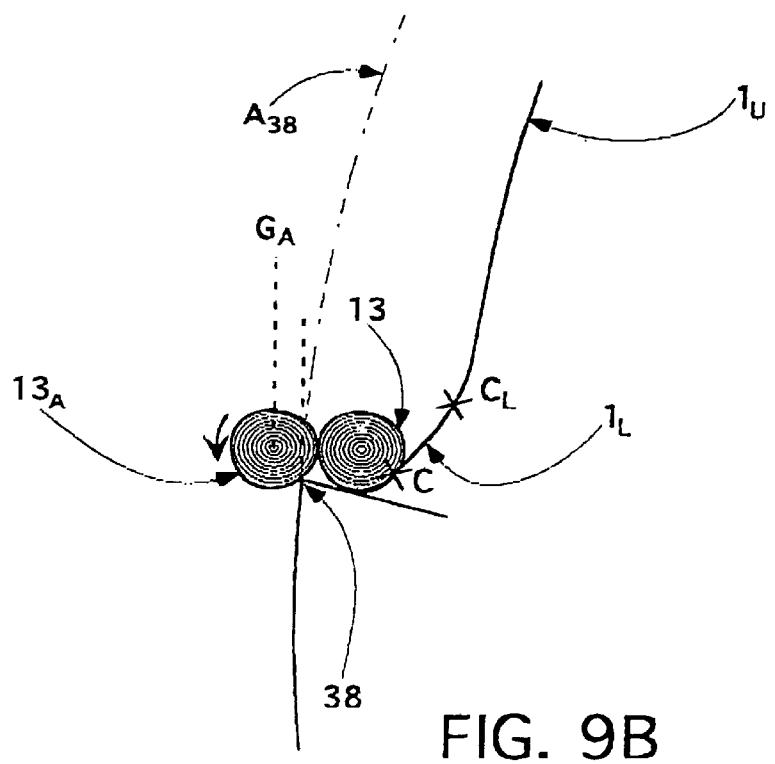
FIG. 9B is a schematic view of two smaller logs sitting on lower lifting surfaces of a log singulator according to a currently preferred embodiment of the invention.

Lower portion $1_L$ is located below contact point $C_L$. As shown in FIG. 9A, were lower portion $1_L$ to follow the arcuate profile of upper portion $1_U$, there would be situations where two small diameter logs could be raised together by lower lifting surfaces 14. This can occur if the centre of gravity $G_A$ of a second log 13A is located inside tipping point 38. Lower portion $1_L$ is designed so that only one of either largest log $13_L$ or smallest log $13_S$, which it is expected that singulator 4 should handle, can rest on lower lifting surfaces 14 and be carried upward at a time. As shown in FIG. 9B, this is accomplished by having the profile of lower portion $1_L$ be such that the contact point C with the lower guiding barrier of any of the range of logs, which it is expected that singulator 4 should handle (from smallest log $13_S$ to largest log $13_L$), will position the log far enough out along lifting surfaces 14 that a smallest expected second log 13A (whose diameter could be as small as that of smallest log $13_S$) cannot rest on lower lifting surfaces 14 because its centre of gravity would fall outside tipping point 38. The shape of lower portion $1_L$ is determined by the necessary location of the various contact points C (of any of the range of logs which it is expected that singulator 4 should handle i.e. from smallest log $13_S$ to largest log $13_L$) which will ensure that any log 13A, not smaller than smallest log $13_S$, will see its centre of gravity $G_A$ located outside tipping point 38. As a result, lower portion $1_L$ slopes outwardly toward log deck 7.

Figure 3:
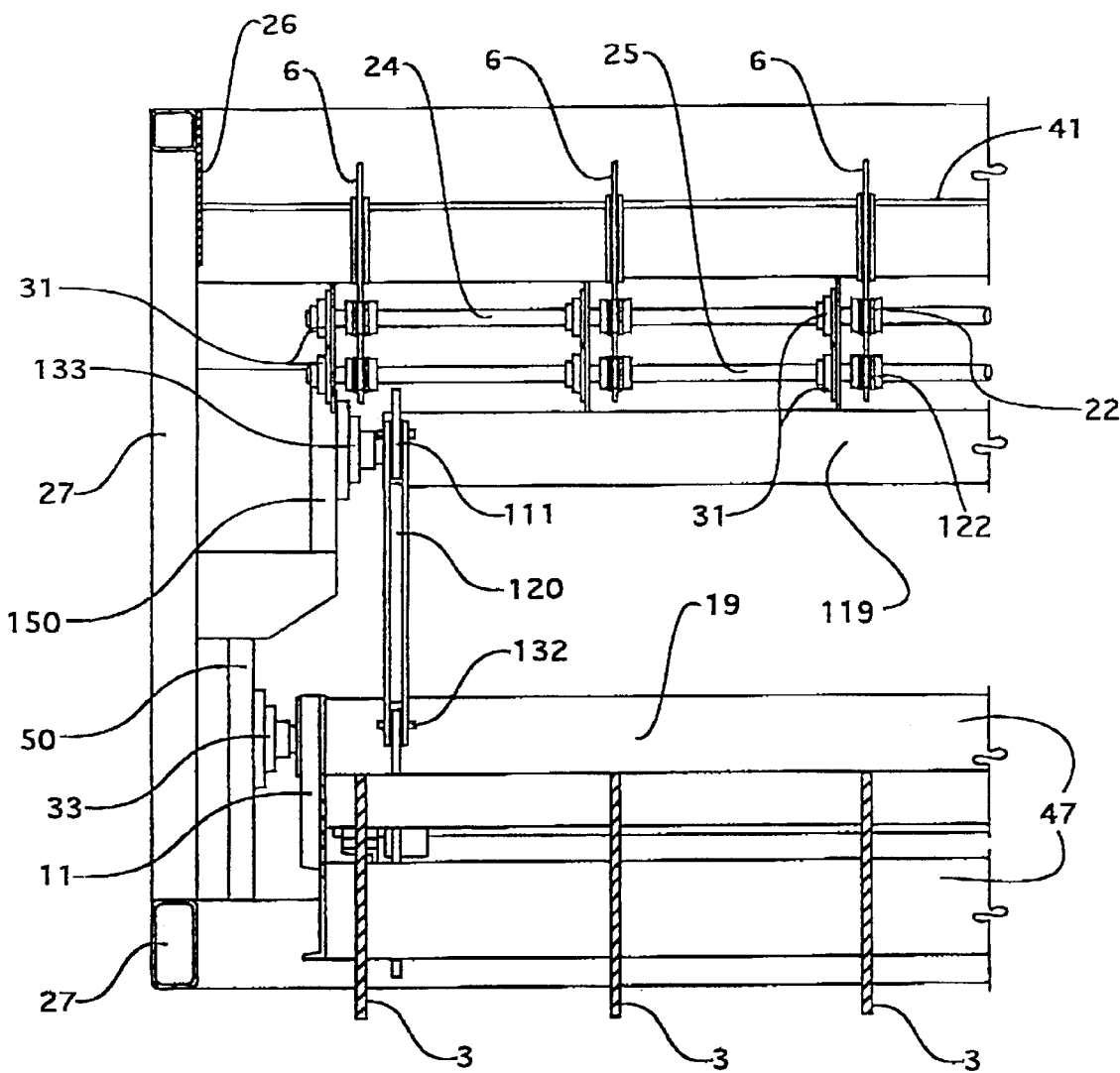
FIG. 3 is a schematic sectional view of the undriven end of the log singulator of FIG. 1.
Figure 4:
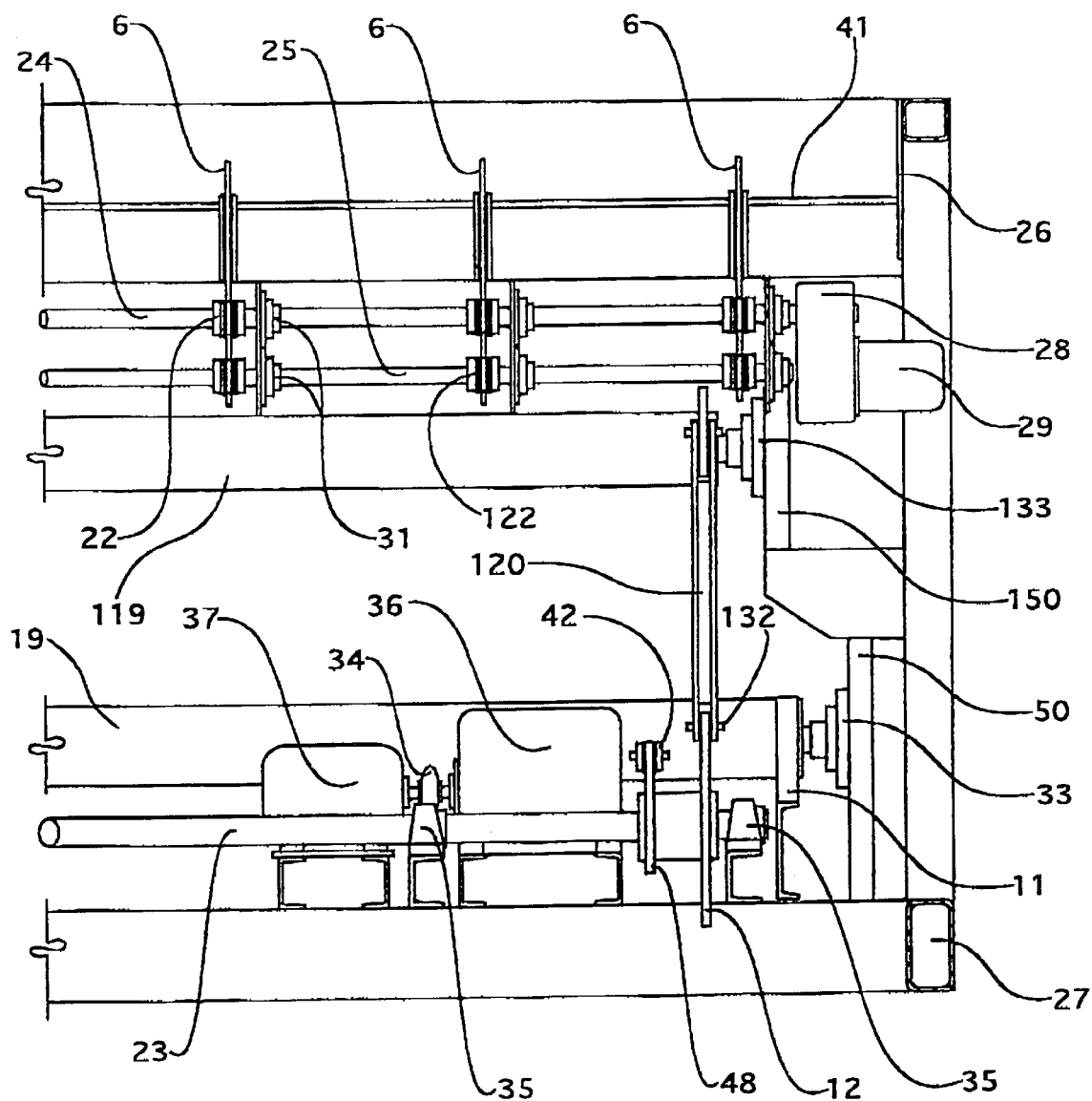
FIG. 4 is a schematic sectional view of the driven end of the log singulator of FIG. 1.

As shown in FIGS. 1, 3 and 4, preferably, each lower lifting plate 3 is pivotally mounted to a lower portion of frame 50 of singulator 4 via a pair of lower lifting arms 11 and pivot mechanisms 17, with a transverse structural steel beam 47 linking lifting plates 3 to one another and to the pair of lower lifting arms 11. Each pivot mechanism 17 may comprise a pivot tube 19 and bearings 33, which are recessed away from the log input area of singulator 4 (i.e. away from log deck 7).

The location of pivot mechanisms 17 and the geometrical characteristics of the outside face 30 of lower lifting plate 3 are preferably designed to minimize power requirements and friction forces. Minimization of power requirements may be accomplished by having each pivot mechanism 17 located lower than lower holding notches 16. The result is that the elevating motion of lower lifting plates 3 provide relief from logs 9 pushing against lower guiding rails 1. Were pivot mechanism 17 located higher than lower holding notches 16, the initial path of movement of lifting surfaces 14 would be toward logs 9 (as the centre of rotation of lower lifting surfaces 14 would be higher than holding notches 16). With pivot mechanism 17 being located lower than lower holding notches 16, lifting surfaces 14 arc away from logs 9, along their whole path of movement, thereby minimizing the power requirements for driving lifting plates 3.

In the preferred embodiment, minimization of friction forces between log 13 and upper portion $1_U$ of guiding rails 1 is accomplished by having lower lifting surfaces 14 trace an arc $A_{38}$ whose centre of rotation coincides as much as possible with the centre of curvature of the upper portion $1_U$ of guiding rails 1, along as much of the length of guiding rails 1 as possible (see FIG. 8). However, for the purpose of minimization of friction forces, any shape of upper portion $1_U$ where any log 13 moves parallel to or away from (i.e. away from log deck 7) the path of lifting surfaces 14 (i.e. away from arc $A_{38}$), as it is being carried upward, is appropriate. Indeed, when log 13 moves parallel to or away from (i.e. away from log deck 7) the path of lifting surfaces 14 (i.e. away from arc $A_{38}$), the friction forces between log 13 and the lower barrier are lower than the relevant friction forces generated were log 13 moving toward the path of lifting surfaces 14 (i.e. toward arc $A_{38}$). A reduction in the friction forces between log 13 and the lower barrier means a reduction in the required power to carry log 13 upward.

Minimization of friction forces between lower lifting plates 3 and logs 9 is accomplished by having, as much as possible, the whole profile of outside face 30 parallel to the arc traced by the movement of lower lifting surfaces 14.

Figure 2A:
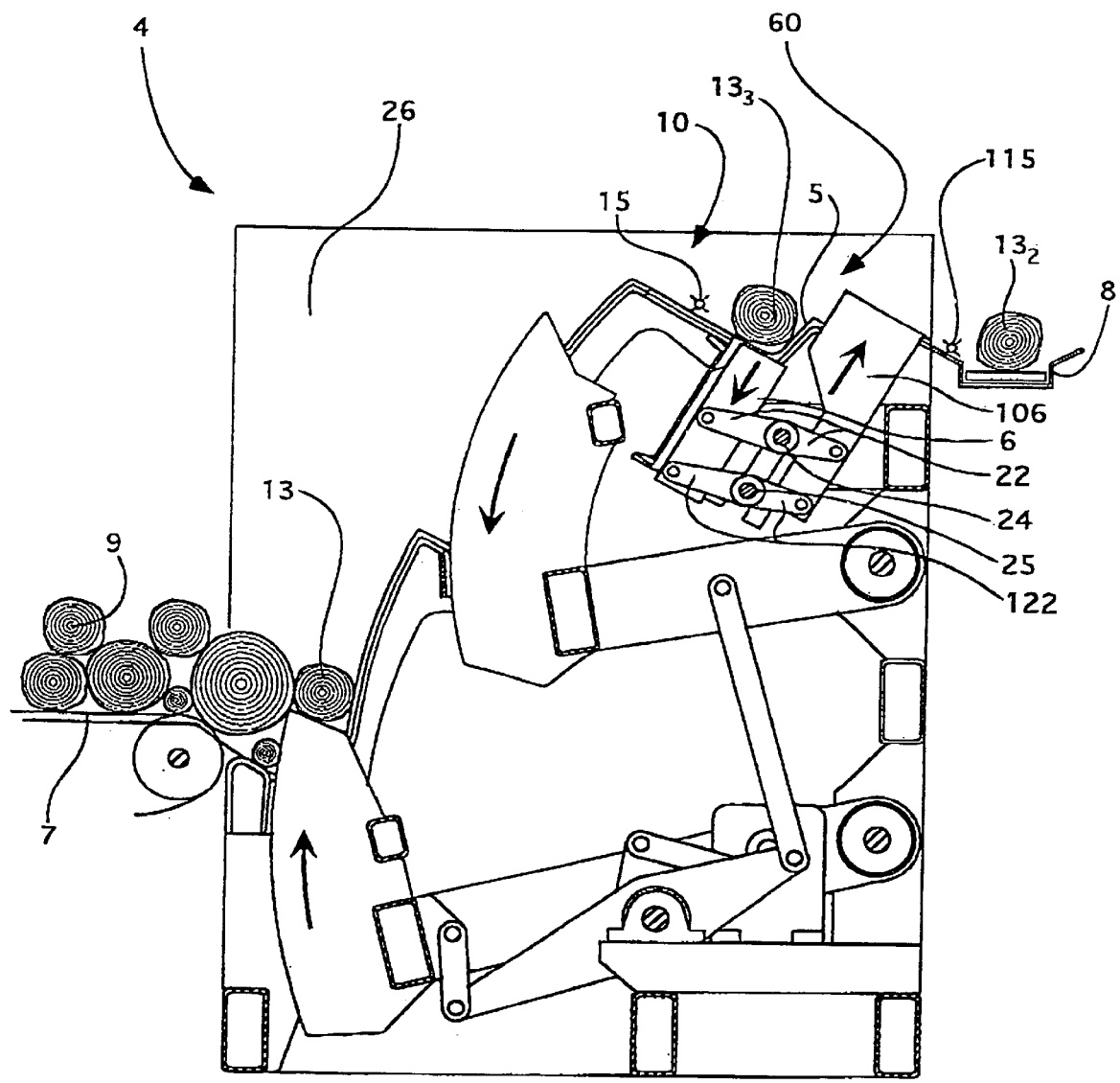
FIGS. 2A, 2B, 2C and 2D are further schematic side views of the log singulator of FIG. 1 during different stages of operation.
Figure 2B:
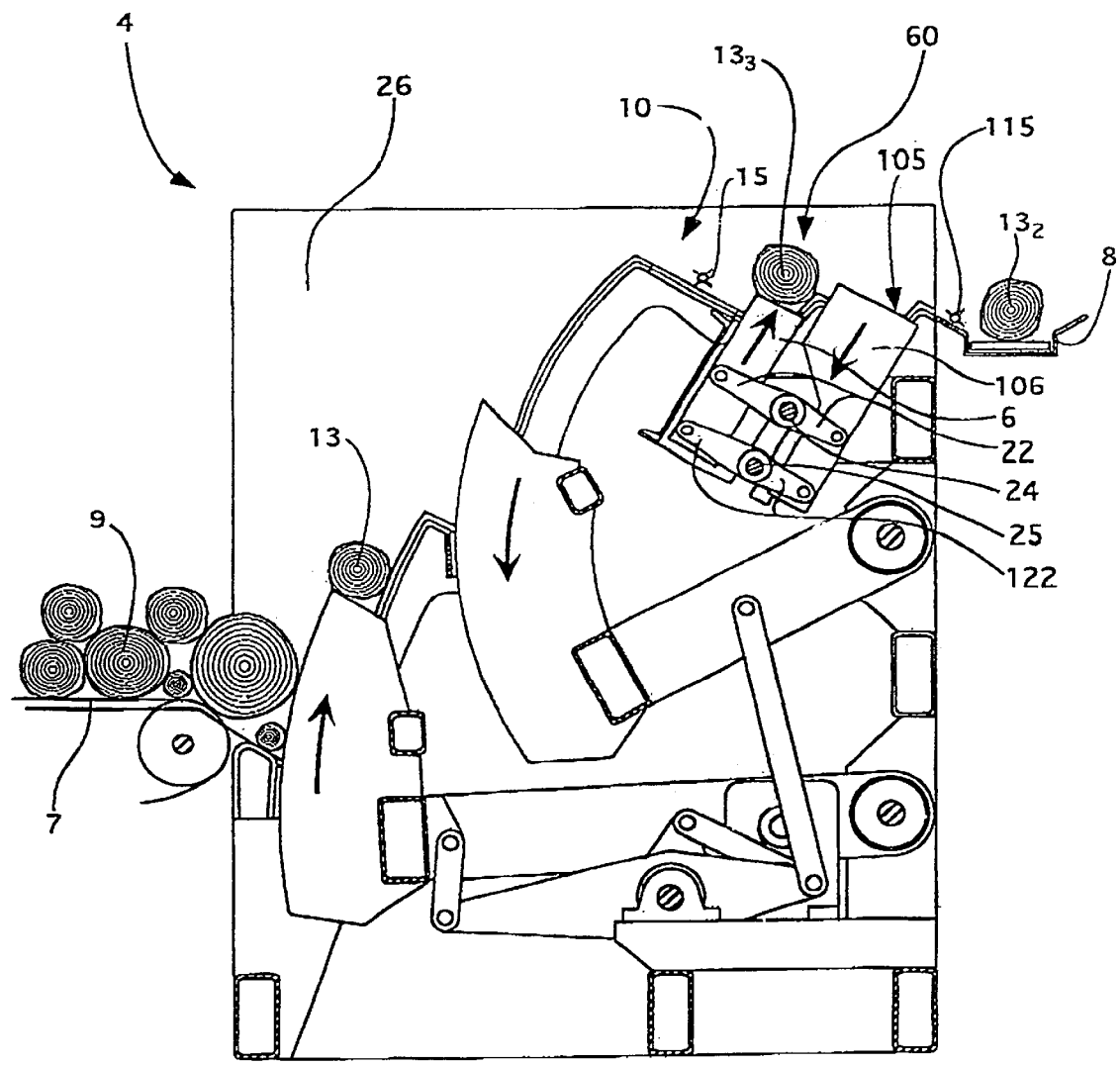
Figure 2C:
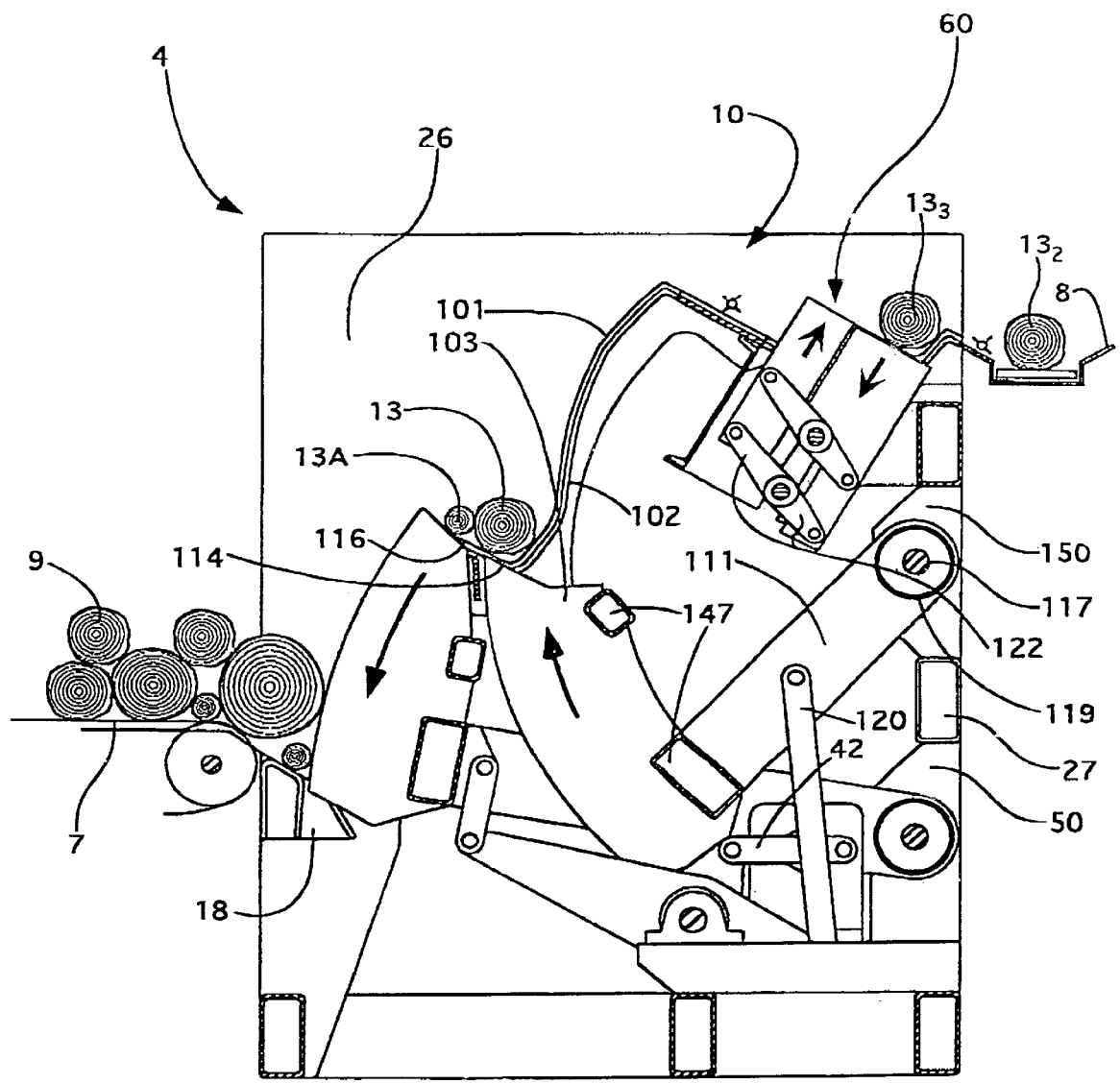

The above-mentioned constituent parts of singulator 4 make up its lower lifting portion. Similar constituent parts, located above the lower portion, make up the upper lifting portion of singulator 4. In the currently preferred embodiment of the invention, the upper lifting portion comprises main elements similar to those found in the lower lifting portion including (as shown in FIGS. 2C, 3 and 4):

1) an upper lifting device
   The upper lifting device preferably comprises upper lifting plates 103. Each upper lifting plate 103 is preferably pivotally mounted to the upper portion of frame 150 of singulator 4 via upper lifting arms 111 and pivot mechanisms 117, with a transverse structural steel beam 147 linking lifting plates 103 to one another and to upper lifting arms 111. Each pivot mechanism 117 comprises a pivot tube 119 and bearings 133, which are recessed away from the log input area of singulator 4 (i.e. away from log deck 7).
   Located at the top edge of each upper lifting plate 103, upper lifting surfaces 114 constitute points of engagement between a log 13 being raised from holding notches 116 against upper guiding rails 101 and lifting plates 103.

2) an upper guiding barrier
   The upper guiding barrier preferably comprises upper guiding rails 101. Similarly to the lower guiding barrier, each set of guiding rails 101 is spaced apart to leave slots 139 (shown in FIG. 5). Slots 139 are of sufficient width to permit the passage of upper lifting plates 103. Continuous surface plates 102, located between each set of guiding rails 101, prevent log ends or debris from protruding into the mechanism of singulator 4. Furthermore, continuous surface plates 102 are recessed so as not to interfere with the guiding function of guiding rails 101.
   Located at the bottom of upper surface plates 101, upper holding notches 116 comprise openings 118 for debris to fall through (shown in FIG. 1). Singulator 4 is preferably designed so that upper holding notches 116 are located above the top of pile of logs 9.

During operation, it is possible that more than one log may have been raised by lower lifting surfaces 14 to the upper lifting portion of singulator 4. For example, because of the pushing forces generated by logs 9, a second log could have been positioned on top of, and raised upward with, log 13. Similarly, the pushing forces generated by logs 9 could have held a second log 13A in position beside log 13 along a sufficiently long vertical distance to result in both logs being raised upward. Indeed, referring to FIG. 9B, if log 13A is held beside log 13, by the pushing forces generated by logs 9, at least until log 13 reaches upper portion $1_U$ of the lower guiding barrier, centre of gravity $G_A$ of log 13A will by then be within tipping point 38 and therefore be carried upward alongside log 13. Geometrical characteristics of the main elements of the upper lifting portion of singulator 4 are therefore preferably designed to achieve similar results as that of the main elements of the upper lifting portion of singulator 4 i.e.:

1) Singulation of only one of either the largest or smallest log at a time, such that more than any one log will usually fall off when upper lifting plates 103 are raised; and 2) Minimization of friction forces.

Figure 2D:
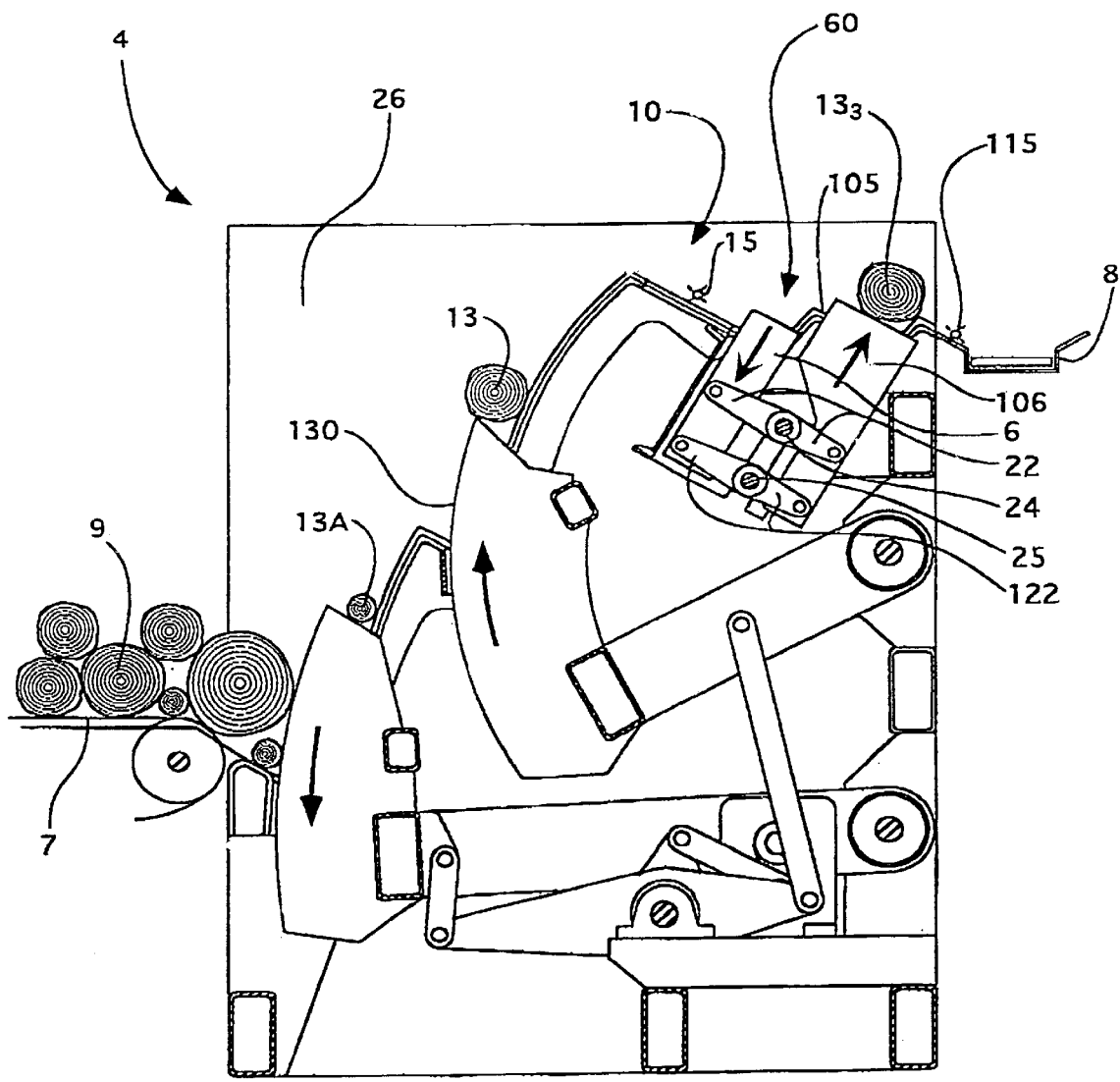

The geometrical characteristics of the main elements of the upper lifting portion of singulator 4, in combination with the absence of the pushing forces generated by logs 9, will usually result in any more than one log that will have reached the upper lifting portion of singulator 4 falling back down as lower guiding plates 3 are moving back down toward notches 16. The positioning of any log 13A which will have been raised by lifting plates 3 will, in almost all cases, be positioned linearly adjacent to log 13, as shown for example in FIG. 2C. As shown in FIG. 2D, because only one log will be carried upward by upper lifting surfaces 114 (as per item "1" above), the extra log (log 13A in the example shown in FIGS. 2C and 2D) will lie outside of outside face 130 of upper lifting plates 103. The depth of upper holding notches 116 is such that, in most cases, the extra log will not be able to rest between outside face 130 and the outside edge of holding notches 116 as its centre of gravity will lie outside. As a result, because of the absence of pushing forces similar to those generated by logs 9, the extra log, in most cases, will fall back down as lower guiding plates 3 move back down toward notches 16. It should however be noted that the extra log will not always fall back down, as the depth of upper holding notches 116 does not ensure that a smaller dimensioned log (e.g. smallest log $13_S$) cannot rest between outside face 130 and the outside edge of holding notches 116. Whether the extra log falls back down or not does not detract from the singulating capacity of the upper lifting portion of singulator 4.

Similarly to the main elements of the lower lifting portion of singulator 4, the geometrical characteristics of the main elements of the upper lifting portion are preferably as follows:

1) upper lifting device
   The shape of upper lifting surfaces 114 is generally flat and slightly angled/sloping toward upper guiding rails 101. The profile of outside face 130 of upper lifting plates 103 is parallel, as much as possible, to the arc traced by the movement of upper lifting surfaces 114 (as their centres of curvature are similarly located). It is not necessary for pivot mechanisms 117 to be located lower than upper holding notches 116 since the forces pushing toward upper surfaces 101 are very small when compared to the forces generated by logs 9 pushing toward lower surfaces 1. As a result, each pivot mechanism 117 is preferably located at a similar vertical level similar to the level of upper holding notches 116.

2) upper guiding barrier

Figure 10:
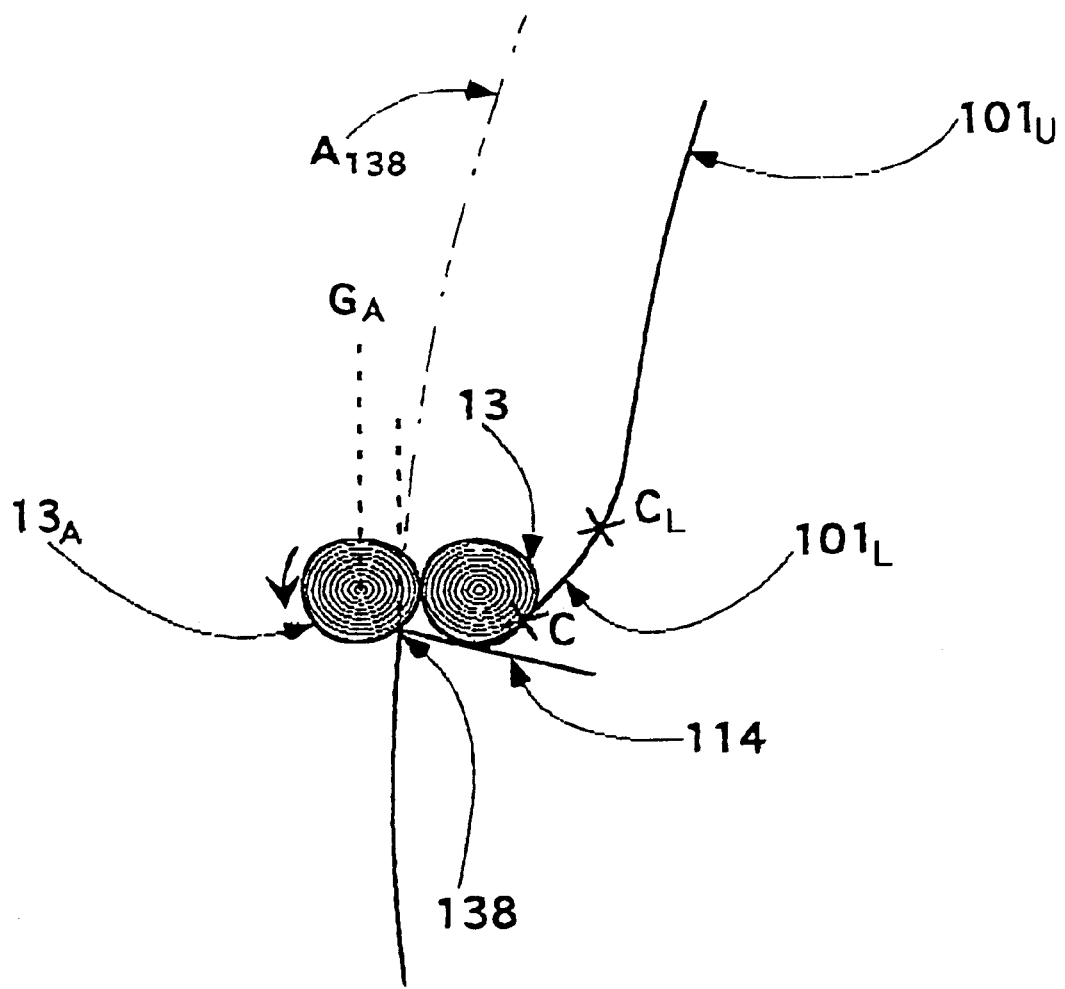
FIG. 10 is a schematic view of two smaller logs sitting on upper lifting surfaces of a log singulator according to a currently preferred embodiment of the invention.

Upper guiding rails 101 are preferably s-shaped i.e. first concave then convex, similarly to guiding rails 1 (as shown in FIG. 10).

The particular characteristics of the upper lifting portion of singulator 4, when compared to the lower lifting portion of singulator 4, are as follows:

1) the upper guiding barrier is located vertically adjacent to the lower guiding barrier, but recessed away from the log input area of singulator 4 i.e. away from log deck 7;

2) in order to reduce the floor space requirement of singulator 4, pivot mechanisms 117 are preferably located at a similar horizontal distance away from pile of logs 9 as are pivot mechanisms 17. The result is that lifting arms 111 are shorter than lifting arms 11 (and consequently the radius of the arc $A_{138}$ traced by the movement of upper lifting surfaces 114 is less than the radius of arc $A_{38}$ traced by the movement of lower lifting surfaces 14); and, 3) to avoid contact between upper lifting plates 103 and lower lifting arms 11, the location of the relevant constituent parts of the upper lifting portion of singulator 4 (i.e. upper lifting plates 103 and upper lifting arms 111) are preferably transversely recessed when compared with the relevant constituent part of the lower lifting portion of singulator 4.

In the currently preferred embodiment of the invention, surface plates 2 and 102, located between guiding rails 1 and 101, prevent ends of logs or debris from protruding into the mechanism of singulator 4. Furthermore, because surface plates 2 and 102 are steel sheeted, they help preserve the geometrical integrity of guiding rails 1 and 101 during operation of singulator 4. Singulator 4 is located between side walls 26, which contain logs during the singulation process. Side walls 26 also add to the overall structural strength of singulator 4, as they are connected via a number of transverse structural steel beams 27. As shown in FIG. 1, all lower lifting plates 3 are connected to one another via a second transverse structural steel beam 47, thereby adding to the overall structural strength of lower lifting plates 3. As shown in FIG. 2C, upper lifting plates 103 are similarly connected to one another via a second transverse structural steel beam 147. In order to avoid potential interference between transverse beams 147 and/or upper lifting arms 111 and transverse beams 47 and/or lifting arms 11, the lower lifting device preferably comprises a pair of lifting arms 11, each located toward the outer extremities of singulator 4. All subsequent upper lifting devices preferably comprise a pair of lifting arms 111, each located inwardly of the relevant lifting arms and of the vertically lower lifting device. It should be noted that the vertically highest lifting device can comprise more than 2 lifting arms (all located inwardly of the lifting arms of the vertically lower lifting arms), subject to space restrictions resulting from the detailed characteristics of unloading station 60.

As indicated previously, in the currently preferred embodiment of this invention, lifting plates 3 and 103 oscillate synchronously in opposite directions to one another along their respective arcs. This is accomplished via a reciprocating mechanism which is shown in FIGS. 1 to 4 (FIGS. 3 and 4 are schematic sectional view of the undriven and driven ends of singulator 4 respectively).

In the currently preferred embodiment of the invention, an electric motor 37 and a gear box 36 drive an eccentric crank 40, which in turn drives a reciprocating connecting link 42. Reciprocating connecting link 42 is eccentrically connected to actuating arm 12. Actuating arm 12 rotates around an equalizer shaft 23 which is supported by equalizer shaft bearings 35. As a result, the required reciprocating movement of actuating arm 12 is accomplished. One end of actuating arm 12 is connected to one of lifting arms 11 (via connecting link 20 and pivot pins 32), while the other end of actuating arm 12 is connected to one of lifting arms 111 (via connecting link 120 and pivot pins 132). As a result, the motions of lifting arms 11 and 111 are synchronized at all times. The connection occurs as much as possible around the end portion of lifting arms 11 and 111, so that lifting forces applied to lifting arms 11 and 111 are applied near lifting plates 3 and 103; as a result, the reaction forces to be resisted by pivot tubes 19 and 119 are minimized. It should be noted that each part of actuating arm 12 extends a different length from its centre of rotation (ie. from equalizer shaft 23) as a result of the particular location and geometrical characteristics of actuating arm 12 and connecting links 20 and 120. It should further be noted that, whereas in the currently preferred embodiment of the present invention actuating arm 12 drives one lifting arm 11 and one lifting arm 111 (with all lifting arms 11 being interconnected to one another through transverse beams 47 and all lifting arms 111 being interconnected to one another through transverse beams 147), the reciprocating mechanism may be adapted so as to drive more than one lifting arm 11 and more than one lifting arm 111.

The operation of the singulator according to the currently preferred embodiment of this invention is as follows. A log 13 is provided in lower holding notches 16. Log 13 rests against lower guiding rails 1 (as shown in FIG. 1). Lower lifting plates 3 are lifted as lifting arms 11 pivot upwardly and elevate log 13. As lower lifting plates 3 continue to move upwardly along their own defined arc, upper lifting plates 103 move downwardly along their own defined arc, both in a synchronous manner to one another. FIGS. 2A and 2B show this movement. When lower lifting plates 3 reach the upper point of their arc movement, upper lifting plates 103 have reached the lower point of their arc movement. Once the upper point is reached by lower lifting plates 3, because lower lifting surfaces 14 are positioned above upper holding notches 116 and because upper lifting surfaces 114 are positioned below upper holding notches 116, log 13, falls into upper holding notches 116 (as shown in FIG. 2C).

At this point, lifting plates 3 and 103 reverse direction: upper lifting plates 103 are lifted as lifting arms 111 pivot upwardly and carry log 13 upwardly along upper guiding rails 101, and lower lifting plates 3 move downwardly, again in a synchronous manner. As shown in FIGS. 2C and 2D, if more than one log 13 was elevated by lower lifting plates 3 to upper holding notches 116, the extra log(s) 13A should fall off as upper lifting plates 103 are raised because of the geometrical characteristics of upper guiding rails 101 and upper lifting surfaces 114. Said characteristics are similar to that of lower guiding rails 1 and lower lifting surfaces 14.

Typically, any extra log(s) 13A sitting in holding notches 116 would be positioned next to, as opposed to above, log 13 (as shown in FIG. 2C). Therefore, similarly to what was described above, as lifting surfaces 114 rise, centre of gravity $G_A$ of any extra log(s) 13A falls outside of tipping point 138, so that only log 13 is raised upward by lifting surfaces 114. As indicated above, centre of gravity $G_A$ also falls outside of the edge upper holding notches 116, with the result that log 13A will fall back down (as shown in FIG. 2D).

When upper lifting plates 103 reach the upper position of their arc movement (which means lower lifting plates 3 have returned to their initial starting position i.e. the lower position of their arc movement), log 13 falls into unloading station 60.

Figure 7:
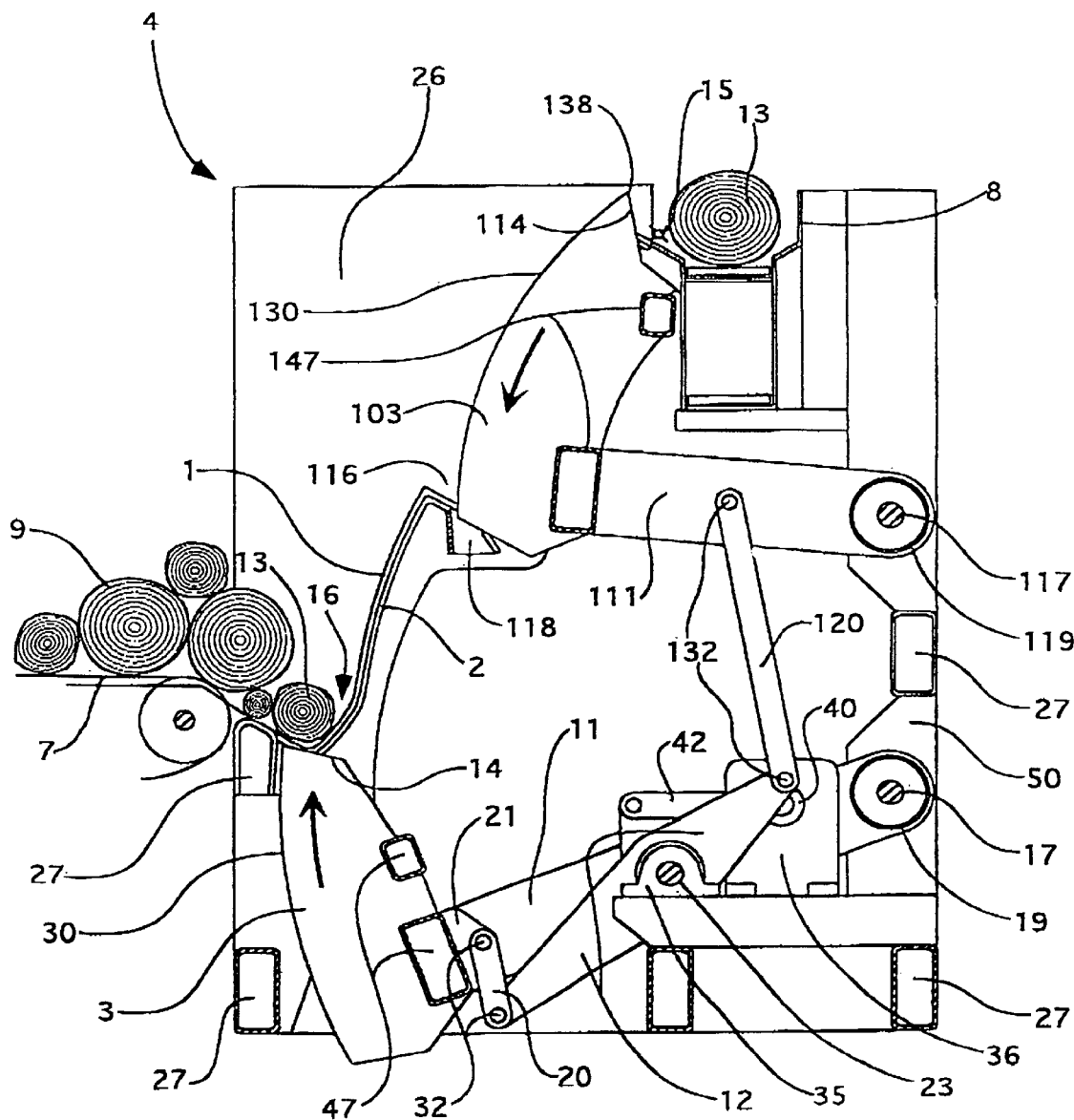
FIG. 7 is a schematic side view of the log singulator according to an alternate embodiment of the invention, wherein there is no unloading station.

Unloading station 60 comprises at least an out-feed conveyor 8, which directs logs individually for processing. A control mechanism, which may include a properly positioned photo cell switch 15, is preferably included to inform a controller, which controls singulator 4, to stop the movement of lifting plates 3 and 103 while out-feed conveyor 8 is still processing a log 13. FIG. 7 shows singulator 4 wherein unloading station 60 of singulator 4 comprises only out-feed conveyor 8. In this embodiment, logs drop directly from upper lifting plates 103 onto conveyor 8. However, in the currently preferred embodiment of this invention, as shown in FIGS. 1 and 2A to 2D, unloading station 60 of singulator 4 comprises further elements.

Unloading station 60 of singulator 4 preferably comprises a surge area 10, capable of holding a number of average size logs (in the currently preferred embodiment, surge area 10 is capable of holding 2–3 average sized logs). Surge area 10 is angled downwardly, so that logs contained within surge area 10 are drawn by the force of gravity. A control mechanism, which can include a properly positioned photo cell switch 15, is preferably included to cause a controller to stop the movement of lifting plates 3 and 103 while surge area 10 is full. FIGS. 1 and 2A through 2D show the unloading portion of singulator 4 comprising surge area 10. In the currently preferred embodiment of the invention, unloading station 60 comprises two sets of secondary holding notches:

1) the first set of secondary holding notches 5 is positioned at the lower extremity of surge area 10 and is adapted to cradle the next log to be ultimately delivered to conveyor 8;
2) the second set of secondary holding notches 105 is recessed away from surge area 10; the second set of secondary holding notches 105 is adapted to cradle a log received from the first set of secondary holding notches 5.

Narrow slots are provided in each set of secondary holding notches 5, 105, to allow movement of secondary lifting plates 6, 106. Secondary lifting plates 6, 106 oscillate synchronously in opposite directions to one another. Similarly to the upper and lower lifting devices, each set of secondary holding notches 5 and 105 are adjacently separated by continuous surface plates 41 to prevent log ends or debris from protruding into the mechanism of singulator 4.

Secondary lifting plates 6 push log 13 out of the first set of secondary holding notches S into a position from which the log can drop into the second set of secondary holding notches 105. Secondary lifting plates 106 lift log 13 from the second set of secondary holding notches 105 to a position from which the log drops onto out-feed conveyor 8. In order to minimize friction forces, movement of secondary lifting arms 6 and 106 is not exactly parallel, but moves slightly away from the slope of each set of secondary holding notches 5, 105, facing surge area 10, against which log 13 is carried upwards.

A control mechanism, which can include a properly positioned photo cell switch 115, is preferably included to inform a controller, which controls singulator 4, to stop the movement of secondary lifting plates 6, 106 while out-feed conveyor 8 is still processing log 13. As a result, unloading station 60 can act as a storage area for logs while out-feed conveyor 8 is processing a log 13.

Secondary lifting plates 6, 106 are linked to one another via actuating arms 22, which rotate around actuating shaft 24 with the help of bearings 31. In order to insure proper movement of lifting plates 6, 106, the lifting plates 6, 106 are further linked to one another via trailing arms 122, which rotate around trailing shaft 25 with the help of bearings 31. As a result, the preferred counter-parallel movement of lifting plates 6, 106 is accomplished.

In order to avoid potential interference between the lifting arms of the vertically highest lifting device (i.e. upper lifting arms 111) and the secondary lifting devices (i.e. secondary lifting plates 6, 106 and/or trailing arms 122), each secondary lifting device is transversely located in such a way so as to avoid such interference. Singulator 4 is further preferably designed so that upper lifting arms 111 never reaches trailing shaft 25 (nor actuating shaft 24), as trailing shaft 25 links all secondary lifting devices (more specifically all secondary lifting plates 6, 106 to one another). Alternatively, the vertically highest lifting device is to comprise only 2 lifting arms (located inwardly of the lifting arms of the vertically lower lifting arms), with all secondary lifting devices being located inwardly of the 2 lifting arms of the vertically highest lifting device.

The lightly loaded secondary lifting plates 6, 106 are driven by an electric motor 29 and gear box 28, which are mounted directly on actuating shaft 22 and provide the needed reciprocating motion. Direct drive eliminates the use of eccentric linkages for this mechanism (as was used with respect to lifting plates 3 and 103). Variable frequency drive electric motors are the preferred means of actuation, but hydraulic motors or hydraulic cylinders could be used if desired.

The operation of unloading station 60 according to the currently preferred embodiment of this invention is as follows. As shown in FIG. 1, log $13_1$ is carried toward the wood processing facility by out-feed conveyor 8. Once photo cell switch 115 has detected that out-feed conveyor 8 is available to receive another log, the movement of secondary lifting plates 6, 106 can start. FIG. 1 shows log $13_2$ being carried by secondary lifting plates 106 from secondary holding notches 105 to out-feed conveyor 8; meanwhile, log $13_3$ is sitting in surge area 10 and rolling toward secondary holding notches 5. As shown in FIG. 2A, when secondary lifting plates 106 reaches the upper position of their movement, log $13_2$ falls in out-feed conveyor 8; meanwhile, secondary lifting plates 6 reaches the lower position of their movement, thereby allowing log $13_3$ to fall in secondary holding notches 5. At this point, secondary lifting plates 6 and 106 reverse direction: secondary upper lifting plates 106 move downwardly, while secondary lower lifting plates 6 move upwardly. As shown in FIG. 2B, in doing so, log $13_3$ is raised toward secondary holding notches 105. Meanwhile, log $13_2$ is carried toward the wood processing facility by out-feed conveyor 8. As shown in FIG. 2C, once the lower point is reached by secondary upper lifting plates 106, log $13_3$ is allowed to fall in secondary upper holding notches 105. At that point, if photo cell switch 115 detects that out-feed conveyor 8 is not available to receive another log (i.e. is still processing log $13_2$), the movement of secondary lifting plates 6, 106 stops. Once photo cell switch 115 has detected that out-feed conveyor 8 is available to receive another log, the movement of secondary lifting plates 6, 106 can start again (as shown in FIG. 2D).

Figure 6:
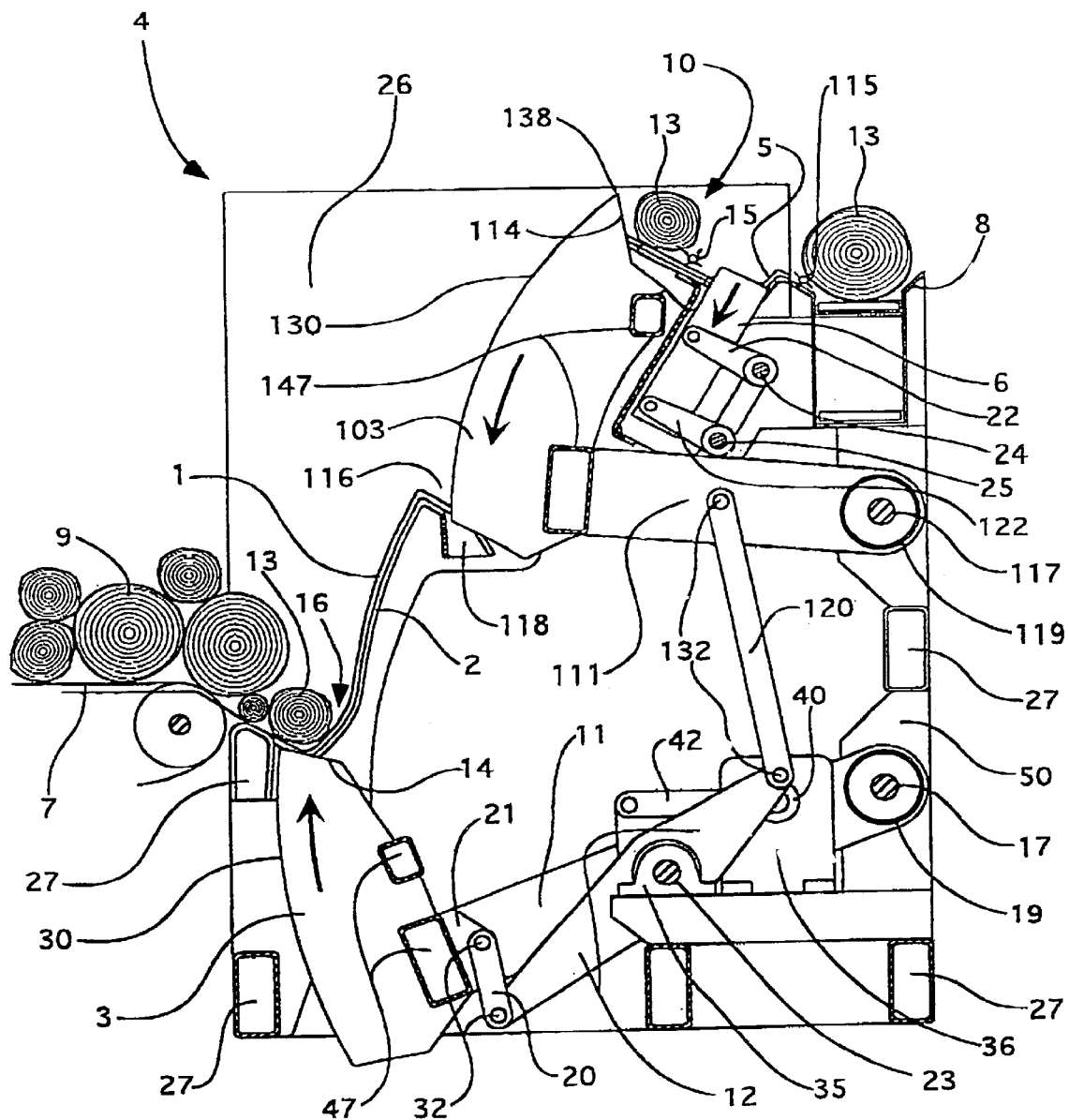
FIG. 6 is a schematic side view of the log singulator according to an alternate embodiment of the invention, wherein the unloading station is different.

FIG. 6 shows an alternative embodiment of the invention wherein unloading station 60 comprises a single set of secondary holding notches and lifting plates (an alternative embodiment of the invention shown at FIG. 7 does not comprise holding notches).

As will be apparent to those skilled in the art in the light of the foregoing disclosure, many alterations and modifications are possible in the practice of this invention without departing from the spirit or scope thereof.

For example, instead of a singulator with only two levels (a lower and an upper), a multi-level singulator could be provided by this invention, with each set of vertically adjacent lifting plates preferably oscillating synchronously in opposite directions to one another along a defined arc. More specifically, were singulator 4 to comprise more than 2 lifting portions, log 13, elevated by upper lifting plates 103, would fall in the holding notches of the $3^{rd}$ lifting portion of singulator 4. Log 13 would be carried upwards along successive lifting portions until it would fall into unloading station 60. In such an alternative embodiment of this invention, odd-numbered lifting portions of singulator 4 (i.e. $1^{st}$ lifting portion, $3^{rd}$ lifting portion etc. . . . ) would have their lifting plates moving temporally in similar directions along their own defined arc, with the lifting plates of even-numbered lifting portions of singulator 4 (i.e. $2^{nd}$ lifting portion, $4^{th}$ lifting portion etc. . . . ) oscillating temporally synchronously in opposite directions to said lifting plates of odd-numbered lifting portions.

Further alterations or modifications in the practice of this invention, without departing from the spirit or scope thereof, are possible. For example, various devices to ensure that lifting plates 3 and 103 oscillate synchronously in opposite directions could be provided, such as interlocking circular members. Also, unloading station 60 may include several sets of secondary holding notches, along with the relevant sets of secondary lifting plates. Finally, unloading station 60 may comprise a conventional log loader indexing mechanism for identifying logs as they pass through unloading station 60 toward out-feed conveyor 8.

Accordingly, the scope of the invention is to be construed in accordance with the substance defined by the following claims.

What is claimed is:

1. A log singulator comprising a first lifting stage, the first lifting stage comprising:
   a first guiding barrier having a substantially continuous transversely-extending front surface, the front surface having a profile comprising an upper section and a lower section, the front surface having a varying steepness such that at least a portion of the upper section adjoining the lower section is steeper than the lower section;
   a first lifting device comprising a plurality of arcuately movable first lifting arms projecting through transversely spaced-apart substantially vertically-extending slots in the first guiding barrier, the first lifting arms movable to lift a log from a log receiving station at a base of the first guiding barrier adjacent the lower section of the front surface profile to an elevated location.

2. A log singulator according to claim 1 comprising a plurality of rails on the guiding barrier, the rails following the profile of the front surface of the guiding barrier and projecting forwardly from the front surface of the guiding barrier.

3. A log singulator according to claim 2 wherein the rails extend along edges of the slots.

4. A log singulator according to claim 3 wherein the rails extend along two edges of each of a plurality of the slots.

5. A log singulator according to claim 1 wherein the upper section of the front surface of the first guiding barrier is convex.

6. A log singulator according to claim 1, wherein the upper section of the front surface of the first guiding barrier follows an arc having a center of curvature approximately coinciding with a center of rotation of the first lifting device.

7. A log singulator according to claim 1 comprising a log deck disposed to push transversely extending logs against the guiding barrier.

8. A log singulator according to claim 1 wherein upper log-contacting surfaces of the lifting arms are generally straight.

9. A log singulator according to claim 1 wherein upper log-contacting surfaces of the lifting arms are angled to slope toward the guiding barrier.

10. A log singulator according to claim 1 wherein the lifting arms comprise upright plates having upper edges which provide log-contacting surfaces.

11. A log singulator according to claim 1 wherein a center of rotation of the lifting device is lower than the log receiving station.

12. A log singulator according to claim 11 wherein the log receiving station comprises a plurality of log holding notches.

13. A log singulator according to claim 1 comprising one or more additional log lifting mechanisms located to further elevate logs which have been elevated by the first lifting stage to an unloading station.

14. A log singulator according to claim 13 wherein the unloading station comprises:
   a first oscillating secondary lifting device, adapted for moving logs received at the unloading station to a horizontally adjacent oscillating secondary lifting device; and
   a second oscillating secondary lifting device, adapted for moving logs onto an out-feed device;
   wherein the logs are moved by horizontally adjacent secondary lifting devices to an out-feed device.

15. A log singulator according to claim 14, wherein each of the secondary lifting devices is disposed to lift logs out of a secondary holding notch.

16. A log singulator according to claim 15 wherein the unloading station comprises a sensor adapted to stop operation of the first lifting device when the sensor has detected that a first secondary holding notch is unavailable to receive a log.

17. A log singulator according to claim 14, wherein the unloading station comprises a sensor adapted to stop the movement of the secondary lifting devices when the sensor has detected that the out-feed device is unavailable to receive a log.

18. A log singulator as recited in claim 14, wherein the unloading station comprises a sensor adapted to stop operation of the secondary lifting devices when the sensor detects that the out-feed device is unavailable to receive a log.

19. A log singulator according to claim 13 wherein the wherein the unloading station comprises:
   a first secondary holding notch, adapted for receiving the log from the upper primary lifting device; and
   a last secondary holding notch, adapted for receiving the log from a horizontally adjacent secondary oscillating lifting device;
   wherein the log is moved sequentially over horizontally adjacent secondary holding notches to an out-feed device.

20. A log singulator according to claim 13, wherein the unloading station comprises a surge area adapted for receiving a log from the additional lifting mechanism when a first secondary holding notch of the unloading station is unavailable to receive a log.

21. A log singulator as recited in claim 20, wherein the unloading station comprises a sensor adapted to stop operation of the additional lifting stage when the sensor has detected that the surge area is unavailable to receive a log.

22. A log singulator as recited in claim 13, wherein the unloading station comprises an oscillating secondary lifting device, adapted for lifting logs, received from the additional lifting mechanisms to the out-feed device.

23. A log singulator according to claim 1 comprising an additional lifting stage, the additional lifting stage comprising a second lifting device comprising a plurality of arcuately movable lifting arms movable to elevate a log from the elevated location.

24. A log singulator according to claim 23 wherein the additional lifting stage comprises:

a second transversely extending guiding barrier having a substantially continuous front surface, the front surface having a profile comprising an upper section and a lower section, the front surface having a varying steepness such that at least a portion of the upper section adjoining the lower section is steeper than the lower section; and, wherein the arms of the second lifting device project through transversely spaced-apart substantially vertically extending slots in the second guiding barrier and the additional lifting stage is disposed to elevate logs received from the first lifting stage to an unloading station.

25. A log singulator according to claim 24 wherein the arms of the first and second lifting devices are coupled to move synchronously in opposite directions to one another.

26. A log singulator according to claim 1 for lifting logs having diameters between a diameter of a smallest log and a diameter of a largest log wherein the first lifting device has a tipping point such that if a center of gravity of a log on the first lifting device is between the tipping point and the first guiding barrier then the log tends to stay on the first lifting device and if the tipping point is between the guiding barrier and the center of gravity of the log then the log tends to fall off of the primary lifting device; and, the lower section of the first guiding barrier is shaped such that, when the primary lifting device is in a lowered position, with the smallest log and another log having a diameter at least equal to the diameter of the smallest log both on the first lifting device with the another log positioned against the guiding barrier, the center of gravity of the smallest log is located outside of the tipping point; and when the primary lifting device is located in the lowered position, with the largest log positioned on the primary lifting device and resting against the guiding barrier, the center of gravity of the largest log is located inside of the tipping point.

27. A log singulator according to claim 1, wherein logs are delivered from the elevated location to an unloading station comprising an oscillating secondary lifting device, adapted for lifting logs to the out-feed device.

28. A method for singulating logs having diameters within a range extending from a diameter of a smallest log to a diameter of a largest log, the method comprising:

elevating a log having a diameter in the range on an arcuately oscillating lifting device against a guiding barrier to an upper station;

wherein:

the lifting device has a tipping point such that if a center of gravity of a log on the lifting device is between the tipping point and the guiding barrier then the log tends to stay on the lifting device and if the tipping point is between the guiding barrier and the center of gravity of the log then the log tends to fall off of the lifting device;

the guiding barrier has a transversely-extending substantially continuous front surface, the front surface having a profile comprising an upper section and a lower section, the front surface having a varying steepness such that at least a portion of the upper section adjoining the lower section is steeper than the lower section;

and the method comprises:

allowing the lower section of the guiding barrier to position the log on the lifting device such that any other log on the lifting device having a diameter in the range has its center of gravity outside the tipping point and falls off of the lifting device; and allowing the log to follow a path which follows the profile of the front surface of the guiding barrier while keeping the center of gravity of the log between the tipping point and the guiding barrier until the log has been lifted sufficiently to reach the upper station.

* * * * *